(12) United States Patent
Hansen et al.

(10) Patent No.: US 9,782,927 B2
(45) Date of Patent: Oct. 10, 2017

(54) METHOD AND DEVICE FOR JOINING TRANSFER OR LAMINATING FILM WEBS

(75) Inventors: Achim Hansen, Zug (CH); Thomas Bernet, Pfaffnau (CH)

(73) Assignee: OVD KINEGRAM AG, Zug (CH)

( * ) Notice: Subject to any disclaimer, the term of this patent is extended or adjusted under 35 U.S.C. 154(b) by 411 days.

(21) Appl. No.: 14/342,090

(22) PCT Filed: Jul. 31, 2012

(86) PCT No.: PCT/EP2012/064913
§ 371 (c)(1),
(2), (4) Date: Jun. 17, 2014

(87) PCT Pub. No.: WO2013/029901
PCT Pub. Date: Mar. 7, 2013

(65) Prior Publication Data
US 2014/0311654 A1     Oct. 23, 2014

(30) Foreign Application Priority Data
Sep. 1, 2011   (DE) .......................... 10 2011 111 786

(51) Int. Cl.
*B29C 65/00*       (2006.01)
*B65H 21/00*      (2006.01)
(Continued)

(52) U.S. Cl.
CPC .............. *B29C 65/02* (2013.01); *B29C 65/08* (2013.01); *B29C 65/087* (2013.01); *B29C 65/16* (2013.01);
(Continued)

(58) Field of Classification Search
CPC ......... B29C 65/00; B29C 65/02; B29C 65/08; B29C 65/087; B29C 65/16;
(Continued)

(56) References Cited

U.S. PATENT DOCUMENTS 4,259,399 A * 3/1981 Hill ....................... B29C 65/086
156/238
6,482,291 B1 * 11/2002 Kume ..................... B29C 65/08
156/553
(Continued)

FOREIGN PATENT DOCUMENTS

DE       3524964        1/1987
DE       10226148       12/2003
(Continued)

OTHER PUBLICATIONS

Schwartz O., Ebeling F.-W., Furth B., (D2) Sankt Petersburg, Verlag "Professija," 2005, pp. 260-261, 263, 272-275.

*Primary Examiner* — Jacob T Minskey
*Assistant Examiner* — Matthew Hoover
(74) *Attorney, Agent, or Firm* — Hoffman & Baron, LLP (57) ABSTRACT

A description is given of a method for joining a first and a second film web (2, 2') of a transfer film or laminating film, wherein the film webs (2, 2') comprise a thermoplastic carrier film (21) and a decorative layer (23). Formed between the first and second film webs (2, 2') is a common joining portion (3), in which the first and second film webs (2, 2') are joined to each other by a welding process. A device for carrying out the method is also described.

16 Claims, 7 Drawing Sheets

(51) Int. Cl.
| | | |
|---|---|---|
| *B29C 65/02* | (2006.01) | |
| *B29C 65/08* | (2006.01) | |
| *B29C 65/16* | (2006.01) | |
| *B29C 65/22* | (2006.01) | |
| *B29C 65/50* | (2006.01) | |
| *B29C 65/78* | (2006.01) | |
| *B29C 65/18* | (2006.01) | |
| *B29C 65/82* | (2006.01) | |
| *B29C 65/48* | (2006.01) | |

(52) U.S. Cl.
CPC ...... *B29C 65/1635* (2013.01); *B29C 65/1654* (2013.01); *B29C 65/1664* (2013.01); *B29C 65/223* (2013.01); *B29C 65/5042* (2013.01); *B29C 65/7817* (2013.01); *B29C 65/7832* (2013.01); *B29C 65/7891* (2013.01); *B29C 66/1122* (2013.01); *B29C 66/1142* (2013.01); *B29C 66/1352* (2013.01); *B29C 66/232* (2013.01); *B29C 66/43* (2013.01); *B29C 66/723* (2013.01); *B29C 66/81267* (2013.01); *B29C 66/81427* (2013.01); *B29C 66/836* (2013.01); *B29C 66/8322* (2013.01); *B29C 66/8362* (2013.01); *B29C 66/98* (2013.01); *B65H 21/00* (2013.01); *B29C 65/168* (2013.01); *B29C 65/1638* (2013.01); *B29C 65/1683* (2013.01); *B29C 65/18* (2013.01); *B29C 65/224* (2013.01); *B29C 65/4815* (2013.01); *B29C 65/8215* (2013.01); *B29C 65/8253* (2013.01); *B29C 66/0044* (2013.01); *B29C 66/431* (2013.01); *B29C 66/71* (2013.01); *B29C 66/72321* (2013.01); *B29C 66/7352* (2013.01); *B29C 66/73341* (2013.01); *B29C 66/73361* (2013.01); *B29C 66/8167* (2013.01); *B29C 66/81422* (2013.01); *B29C 2795/002* (2013.01); *B29K 2995/0027* (2013.01); *B65H 2301/4621* (2013.01); *B65H 2301/4622* (2013.01); *B65H 2301/4634* (2013.01); *B65H 2301/46327* (2013.01); *Y10T 156/10* (2015.01)

(58) Field of Classification Search
CPC ............ B29C 65/1635; B29C 65/1654; B29C 65/1664; B29C 65/223; B29C 65/5042; B29C 65/7817; B29C 65/7832; B29C 65/7891; B29C 66/1142; B29C 66/1352; B29C 66/232; B29C 66/81267; B29C 66/81427; B29C 66/8322; B29C 66/836; B29C 66/8362; B29C 66/98; B65H 21/00
See application file for complete search history.

(56) References Cited

U.S. PATENT DOCUMENTS

| | | | |
|---|---|---|---|
| 6,596,122 B1* | 7/2003 | Savitski | B29C 65/1435 |
| | | | 156/158 |
| 6,951,680 B1 | 10/2005 | Vaulot | |
| 7,645,353 B2* | 1/2010 | Thomaschefsky | B32B 5/26 |
| | | | 156/290 |
| 8,951,179 B2* | 2/2015 | Tommasi | B65H 19/1836 |
| | | | 156/159 |
| 2005/0167053 A1 | 8/2005 | Gajewski et al. | |
| 2009/0044906 A1* | 2/2009 | Goring | B29C 65/1425 |
| | | | 156/272.8 |
| 2011/0297312 A1 | 12/2011 | Matsuo et al. | |

FOREIGN PATENT DOCUMENTS

| | | |
|---|---|---|
| DE | 60023528 | 10/2005 |
| EP | 1184311 | 3/2002 |
| EP | 2216279 | 8/2010 |
| EP | 2305452 | 4/2011 |
| JP | 4420877 | 9/1969 |
| JP | 05246592 | 9/1993 |
| JP | H1148339 | 2/1999 |
| JP | 2000159400 | 6/2000 |
| JP | 2000272013 | 10/2000 |
| JP | 2001001365 | 1/2001 |
| JP | 2001158047 | 6/2001 |
| JP | 2004043072 | 2/2004 |
| JP | 2004256268 | 9/2004 |
| JP | 2008156424 | 7/2008 |
| JP | 2009298136 | 12/2009 |
| WO | WO 00/66345 | 11/2000 |
| WO | WO2010128441 | 11/2010 |

\* cited by examiner

METHOD AND DEVICE FOR JOINING TRANSFER OR LAMINATING FILM WEBS

This application claims priority based on an International Application filed under the Patent Cooperation Treaty, PCT/EP2012/064913, filed on Jul. 31, 2012, and German Application No. DE 102011111786.9, filed on Sep. 1, 2011.

BACKGROUND OF THE INVENTION

The invention relates to a method and a device for joining two transfer or laminating film webs, which comprise a thermoplastic carrier film and a decorative layer.

In the processing and use of transfer films and laminating films, film portions must often be joined to each other in order to assemble correspondingly longer "run lengths" from shorter film webs or strips.

Particular run lengths result both from customer requirements, for example to increase productivity using very long cutting rolls, and from the demand to minimize waste, since setup times or downtime, in particular for changing the rolls, are reduced.

In the "in-house" production and processing of films, there is likewise the need to join film webs to each other to increase productivity, minimize waste and reduce setup times, downtime and start-up processes.

The most common method is joining, also called "splicing", by means in particular of manually affixed adhesive tapes. Here the corresponding films are glued together using self-adhesive tapes customary in the trade. Laminating or transfer films (films coated on one side with a transfer layer) are typically glued on the uncoated side of the film. The width of the adhesive tape is typically in the range of from 2 to 5 cm. Typical thicknesses for adhesive tapes lie in the range of from approximately 30 to 130 µm.

Splicing with adhesive tape has proved its worth in recent years and offers a range of advantages. The method is cost-effective, can be carried out with a relatively high register accuracy of the films relative to each other and the splice, i.e. the joining point or joining seam, has high strengths, in particular tensile strength in the direction of travel of the films. In addition, colored adhesive tapes are often used to characterize particular types of splices and to make them visually distinguishable.

However, splicing by means of adhesive tapes has a range of disadvantages.

In the stamping of individual images, these individual images or motifs, i.e. the panels, are arranged in a particular layout on the film, in particular in regular lines and tracks. The panels to be stamped usually lie so close together that the adhesive tape lies in the area of the stamping zone and at the same time in the area of the panels to be stamped such that these overlapped panels cannot be stamped and are lost. In particular this can lead to stamping errors and/or to contamination of the stamping tool by the adhesive tape or by the adhesive of the adhesive tape emerging at the edge. The splice is therefore detected and the film is advanced, whereby there is a loss of material and productivity is reduced.

In the stamping of individual images on parallel tracks, it is also required that the splice points arrive at the stamping unit at the same time, as the stamping process must be interrupted on all tracks or all panels must be skipped at the same time and all these panels are lost. If the splices are at different points in the films, the stamping process is to be interrupted for longer times or must be repeated a number of times.

In the stamping of individual images by means of multiple applications, additional problems arise. Here the repeat of the individual images, i.e. the space between the individual images, must agree very exactly. For this reason, only film pieces with the same repeat can be spliced together.

Within spliced rolls it is possible that, at the splice point—caused by the higher pressure—cold adhesive emerges at the edge of the splice tape or the roll is "blocked", i.e. adjacent windings on the roll stick together.

Using adhesive tape splicing requires a higher outlay on control engineering.

The use of narrower adhesive tapes with a width of less than 1 cm is generally not possible because the strengths required, in particular tensile strengths during processing, cannot be reliably achieved with narrow adhesive tapes and the splice point can also open due to the tensile forces during winding or inside the roll.

SUMMARY OF THE INVENTION

The object of the present invention is to provide an improved method and an improved device which avoid the named disadvantages.

This object is achieved according to the invention with a method for joining a first and a second film web of a transfer film or laminating film, wherein the film webs comprise a thermoplastic carrier film and a decorative layer, and wherein it is provided that a common joining portion is formed between the first and the second film web, in which the first and second film webs are joined to each other by a welding process.

The object is further achieved with a device for the positive substance joining of a first and a second film web of a transfer film or laminating film, wherein the film webs comprise a thermoplastic carrier film and a decorative layer, and wherein the decorative layer features motifs and/or register marks, and wherein it is provided that the device comprises supporting devices for the first and the second film web and at least one welding head, which is arranged above a joining portion of the first and the second film web, and that at least one of the supporting devices is immovably joined to an adjusting device.

It has surprisingly been shown that a durable and resilient welded joint occurs although the film webs to be welded are formed as multilayer bodies, which comprise further layers in addition to the weldable thermoplastic carrier film, which layers can reduce or inhibit the strength of the welded joint.

Moreover, after welding, the films are very flat without disadvantageous thickening points due to an additional adhesive tape in the area of the seam and they exhibit practically no changes in dimension, in particular one- or two-dimensional deformations, which is very important for example for subsequent processes such as cutting and packing processes.

The transfer films are films the decorative layer of which is transferred by a stamping tool using pressure and/or temperature onto a substrate to be decorated. A carrier film made out of a thermoplastic on which a removable decorative layer is arranged forms the basis of the transfer film.

In addition to one or more decoration layers carrying the decoration, the decorative layer can comprise further layers, for example an adhesive layer, an activating layer for the adhesive layer and a separating layer to make it easier to detach the decorative layer from a carrier film.

The one decoration layer or the several decoration layers can for example each be formed as an optionally dyed, transparent, translucent or opaque lacquer layer, as a fluorescent or phosphorescent lacquer layer, as an optically variable layer and/or as a metallic or non-metallic reflective layer. A decoration layer can thus be formed as a pigmented lacquer layer, with the result that color effects can be formed and images and alpha-numeric signs or symbols can be represented. The decoration layer can be a functional layer, for example a magnetic layer, a photopolymer layer or a layer of conductive, semiconductive or non-conductive polymers. Films with such decoration layers can be used in the field of magnetic films, for protecting banknotes and documents against counterfeiting, for external applications, for example chromium films for license plates or other decorations, in the field of IMD or IML technologies (IMD=In-Mold Decoration; IML=In-Mold Labeling), for antennae applications and for labels for, a wide variety of applications. Moreover, combinations of the named decoration layers can be realized, wherein different layers are present directly or indirectly next to each other in one decoration layer. The layer thickness of such a decoration layer is preferably between 1 µm and 25 µm, further preferably between 1 µm and 5 µm. An optically variable layer can be formed by a replication lacquer layer with a molded, diffractively and/or refractively acting surface relief, a hologram layer, a volume hologram layer, a thin film coating system, which generates color-change effects by means of interference, a liquid crystal layer or a layer containing pigments, for example optically variable interference layer pigments or optically variable liquid crystal pigments or metal or metal-oxide pigments. For example, a refractively acting macrostructure, for example a lens structure, a diffractive diffraction grating, or a hologram, which is preferably covered with a reflective layer, can be molded as surface relief. Metallic layers, which reflect incident light, can be provided to support the optical effects. The decoration layers can be formed differently in areas and be combined with each other as desired, with the result that for example OVD areas (Optically Variable Device) and image areas are represented next to each other or overlapping.

A separation of the decorative layer from the carrier film is not provided for in the case of laminating films. An adhesion-promoting layer can therefore be provided between the decorative layer and the carrier film. In addition to one or more decoration layers, the decorative layer can comprise further an adhesive layer. This can be a hot glue layer or a cold glue layer. The decoration layers can be formed like the decoration layers of the transfer film.

The individual layers of the film structure can consist of thermoplastic material, thermosetting material, for example of lacquers, which can be crosslinked by means of UV radiation, and of hybrid material (thermoplastic, i.e. drying thermally and at the same time crosslinkable using radiation) or combinations thereof.

The layer sequences can also be present many times. It is also possible for a decorative layer of functional and/or decoration layers to be present on both sides of the carrier film.

It was to be expected in particular of the separating layers, which are preferably wax separating layers which are softened when activated by the action of heat during hot stamping and thereby fulfill their separating function, and of metallization layers that they reduce the strength of the welded joint to such an extent that two film webs cannot be securely joined.

Nevertheless, surprisingly, with the method according to the invention and the device according to the invention films can be spliced with great accuracy using a welded joint, wherein a joining portion is formed which does not disrupt production in the roll-to-roll process.

It can be provided that the common joining portion is formed as a lap joint. The lap joint can be formed with a particularly small width, with the result that films on which the distance between the motifs within the layout of the motifs is so small that, if a splice tape is used, the motifs adjacent to the joining portion would not be able to be stamped can also be spliced.

It can also be provided that the common joining portion is formed as a butt joint which is covered by a splice film. However, the splice film is not an adhesive tape, with the result that contamination due to the adhesive emerging cannot occur. The splice film can also have a smaller thickness than an adhesive tape, in particular a thickness of approximately 5 µm to 20 µm.

It can further be provided that the first and second film webs are joined to each other by means of ultrasonic welding.

In a further embodiment it can be provided that the first and second film webs are joined to each other by means of contact welding. In the case of contact welding heated portions of the welding head are brought into thermal contact with the joining portion such that a local melting of the two film webs takes place, which are thereby welded to each other.

It can be provided that a heated tape or a heated wire is used to form a weld seam.

It can further be provided that the first and second film webs are joined to each other by means of laser welding. It can be provided to move a laser along the weld seam and/or to deflect the laser light optically such that it forms a line.

It can be provided that an absorbing layer for laser light is arranged in the joining portion below the first and the second film web. The absorbing layer converts the laser light into heat. In particular this makes it possible to use lower laser outputs. Furthermore, the absorbing layer makes it possible to introduce the energy acting on the welding point into the welding point also from the rear side, i.e. from the side facing away from the laser light. The absorbing layer can be arranged as the uppermost layer or under another layer within a multilayer decorative layer. It is also possible to use several absorbing layers, optionally at different positions within the decorative layer and having optionally different absorbing characteristics for laser light.

In an advantageous embodiment it can be provided that a splice film which absorbs laser light is used as absorbing layer. However, the splice film is not an adhesive tape, with the result that contamination due to the adhesive emerging cannot occur. Advantageously it can be a dyed film made of the material of the carrier film.

The cutting edges of the films can be formed rectilinear. It is also possible to use wavy cut, perforated, saw-toothed edges etc.

It can be provided that a continuous weld seam is formed. In the simplest form, it can be a rectilinear continuous single or multiple seam. The continuous weld seam can also be formed wavy, saw-toothed or meandering. The welding head, for example the contact welding head, the laser beam or the sonotrode, can be moved over the surface of the film in accordance with the named seam contour or a correspondingly shaped welding wire can be provided.

It can also be provided that a discontinuous weld seam is formed. In particular dashed or dotted weld seams can thus be formed by, for example, switching the laser beam on and off, switching the contact welding head or the sonotrode on and off or lifting it off the film surface and replacing it.

It can further be provided that a weld seam is formed in an oscillating shape. In the case of an oscillating weld seam the position of the weld seam and/or the width of the weld seam can be varied. For example the focus of the laser beam can be changed. Further it can be provided to use contact welding heads or sonotrodes with an elongate cross section, for example a rectangular or elliptical cross section, and to rotate or swivel these about their longitudinal axis. The width of the weld seam can be varied in this embodiment by setting differently effective widths of the welding head using the rotation position of the welding head. The effective width of the welding head thus varies between the dimension of the narrow side of the rectangle or the ellipse and the dimension of the broad side of the rectangle or the ellipse.

In a further advantageous embodiment it can be provided that the decorative layer is removed in the area of the weld seam before the welding process. The decorative layer can be removed by bringing it into contact with a self-adhesive tape with subsequent detachment of the decorative layers or by prior transfer to an underlay by means of for example a 3 mm wide heated stamp wheel.

Prior modification, in particular ablation or thermal destruction, of the decorative layer is also possible by means of laser exposure.

It can further be provided that the first and second film webs are aligned with one another such that the motifs and/or register marks arranged on the first film web are aligned with the motifs and/or register marks arranged on the second film web in the joining portion registered with a position tolerance less than +/−0.5 mm. If the motifs have clear contours, for example sharp edges and/or contours, register marks are unnecessary.

Further claims are directed at the design of the device.

It can be provided that the adjusting device is formed such that the motifs and/or register marks arranged on the first film web can be aligned with the motifs and/or register marks arranged on the second film web in the joining portion registered with a position tolerance less than +/−0.5 mm or conversely. The adjusting device can comprise one or more measuring devices and one or more drive devices. The drive devices can for example be integrated in the supporting device. These can be linear motors, wherein the supporting device can comprise a cross table, which is movable in the x and y direction by the linear motors. The measuring device can comprise for example an electronic camera and a computer with image recording and processing software.

It can be provided that the at least one welding head is movable perpendicular to the surface of the film webs.

It can further be provided that the at least one welding head can be rotated about its longitudinal axis, as described further above.

It can further be provided that the at least one welding head can be moved across the surface of the film webs in the x and/or y direction, in particular freely. This option can be preferred when film webs the width of which is greater than the working width of the welding head are spliced.

The welding head can be formed such that it can generate weld seams with any shape and pattern as well as single and multiple weld seams.

It can be provided that the at least one welding head is formed as an ultrasonic welding head. The welding head can have exchangeable sonotrodes, for example to be able to form different weld seam geometries.

It can further be provided that the at least one welding head is formed as a contact welding head. A pulsed operation can be provided to avoid extensive heating of the welding head.

In a further advantageous embodiment it can be provided that the at least one welding head is formed as a laser welding head. The welding device can have a specially designed, in particular a less adhesive underlay (for example of metal, silicone, Teflon, polyamide or similar). An overlay, for example in the form of a silicone overlay, for example arranged between the sonotrode and film surface, is also possible. The welding device can have further devices for cutting and/or fixing the films. Examples are suction devices, clamping and tensioning devices, holding-down devices or combinations thereof.

BRIEF DESCRIPTION OF THE DRAWINGS

The invention is now explained in more detail with reference to embodiment examples. There are shown in FIG. 1a a first embodiment example of a device for joining two transfer or laminating film webs in a schematic side view;

FIG. 5b a second preparation stage of the film end portions in FIG. 5a;

DETAILED DESCRIPTION OF THE INVENTION

Figure 1A:
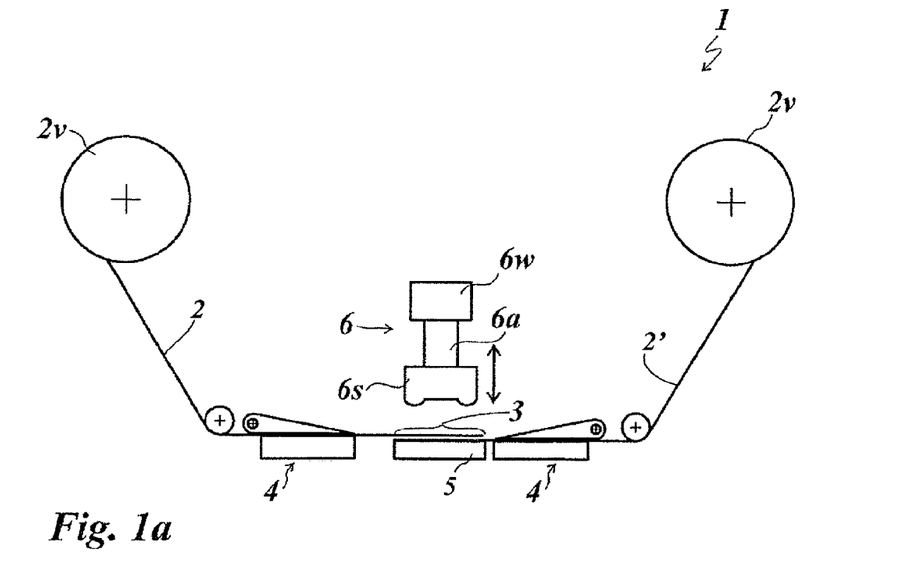
Figure 1B:
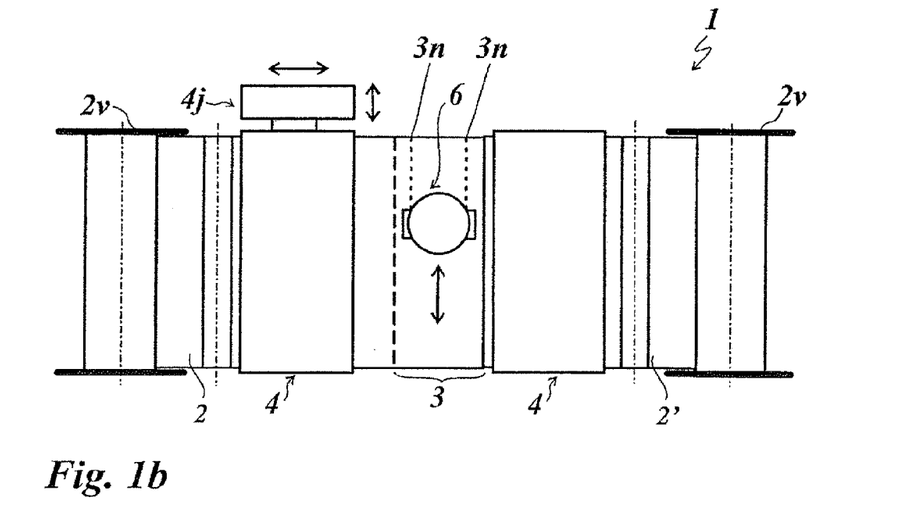
FIG. 1b the device in FIG. 1a in a schematic top view.

FIGS. 1a and 1b show a device 1 for joining or splicing two transfer or laminating film webs 2 and 2' by means of ultrasonic welding in a schematic representation. In the embodiment example shown in FIGS. 1a and 1b the films are transfer films formed as hot stamping films.

The tape-shaped film webs 2 and 2' are provided on feed rollers 2v and fed to supporting devices 4 and 4' which fix the end portions of the film webs. The film webs are present as film reels which in the device 1 are joined to form larger film reels. The films are multilayer bodies which comprise a thermoplastic carrier film and a decorative layer which can be detached from the carrier film and is formed as a transfer layer. The films can have further layers, for example a separating layer arranged between the carrier film and the transfer layer which makes it easier to detach the transfer layer from the carrier film. Reflective layers and protective layers can further be provided as described further below in FIG. 8.

The supporting device 4 is immovably joined to an adjusting device 4j. The supporting device 4 is adjustable in the x and y direction by means of the adjusting device 4j, whereby the positions of the two film webs 2 and 2' can be adjusted relative to each other. With the adjusting device 4j the two film webs 2 and 2' can be aligned with each other such that the motifs and/or register marks arranged on the first film web 2 are aligned with the motifs and/or register marks arranged on the second film web 2' registered with a position tolerance less than +/−0.5 mm and form a lap joint 3, in which they are arranged one on top of the other. In the lap joint 3, the film webs 2 and 2' lie on an anvil 5, which is arranged below an ultrasonic welding head 6. The ultrasonic welding head 6 comprises an ultrasonic transducer 6w, an amplitude transformer 6a and a sonotrode 6s.

A high-frequency alternating current is transmitted to the ultrasonic transducer 6w from which a mechanical ultrasonic oscillation is generated with the aid of the piezo-electric or the magnetostrictive effect. The ultrasonic oscillation is transmitted to the sonotrode 6s via the amplitude transformer 6a. The amplitude of the ultrasonic oscillation and the impedance matching are influenced by the shape and mass of the amplitude transformer 6a. The sonotrode 6s can be produced from steel, aluminum or titanium.

In the embodiment example represented in FIGS. 1a and 1b the sonotrode 6s has two tips spaced apart from one another. By the lowering of the ultrasonic welding head 6 the two tips of the sonotrode 6s come to rest against the film web 2 lying on top in the lap joint 3 and transmit the ultrasonic oscillations to the film material. The anvil 5 forms a counter bearing for the sonotrode 6s. The ultrasonic oscillations are thus transmitted under pressure to the film webs 2 and 2' to be joined, which are arranged one on top of the other in the lap joint 3 on the anvil 5. The areas of the film webs 2 and 2' which are in contact with the sonotrode 6s heat up as a result of the internal friction caused by the ultrasound and merge together.

The lowered ultrasonic welding head 6 can be moved across the longitudinal axis of the film webs 2 and 2' such that a double seam can be produced from two parallel weld seams 3n due to the two tips of the sonotrode 6s (see FIGS. 2a and 2b), which seams extend over the entire width of the film webs 2 and 2'.

It has surprisingly been shown that a durable and resilient welded joint occurs although the aforementioned further layers are arranged between the two carrier films in the lap joint 3 such that the two carrier films are not in direct contact. It was to be expected that wax in particular would act as a separation means also during ultrasonic welding by melting as a result of the energy input and would prevent a lasting welded joint. Further below in FIG. 8 a possible mechanism of action is described which leads to the resilient welded joint.

Figure 2A:
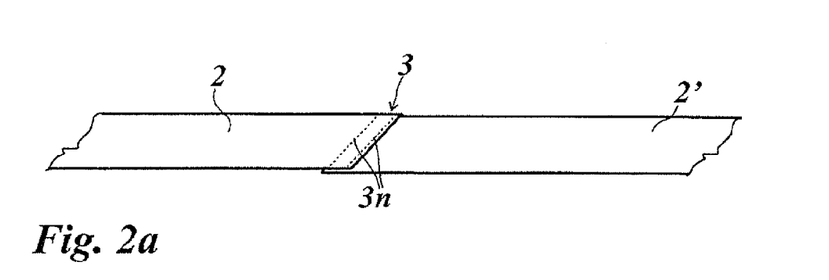
FIG. 2a the film webs in FIG. 1a joined to each other in a schematic perspective representation.
Figure 2B:
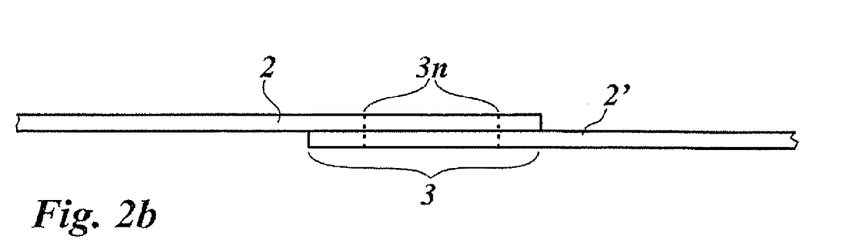
FIG. 2b the film webs in FIG. 1a joined to each other in a schematic sectional representation.

FIGS. 2a and 2b show the film webs in FIG. 1 joined to each other in a schematic perspective representation and in a schematic sectional representation respectively. The film webs 2 and 2' are joined to each other by a double seam, formed from two weld seams 3n.

As an alternative to the double seam made of two rectilinear parallel single seams other double seams can also be realized if the ultrasonic welding head 6 is rotatable about its longitudinal axis (z axis, corresponding to the direction of lowering). The two tips of the sonotrode 6s can thereby also be rotated during the rectilinear movement of the ultrasonic welding head 6 across the longitudinal axis or direction of travel of the film webs 2, 2' such that an oscillating double seam is formed from two parallel, non-rectilinear single seams. Depending on the value of the movement and rotation speed, the resulting, in particular complex, shape, in particular also the density of the crossing connecting seams, i.e. their respective distance from one another, can be controlled. The oscillating double seam can in particular have a shape similar to a guilloche. Such a close-packed double seam can have increased strength, in particular against tensile forces during processing and/or during the reeling of the film webs 2, 2'. It is likewise possible to equip the sonotrode with more than two tips, with the result that either rectilinear parallel multiple seams or, as described above, correspondingly even more complex non-rectilinear multiple seams are formed.

It is likewise possible to combine the multiple seams with the previously described width variations of the seam and/or seam interruptions.

Figure 3:
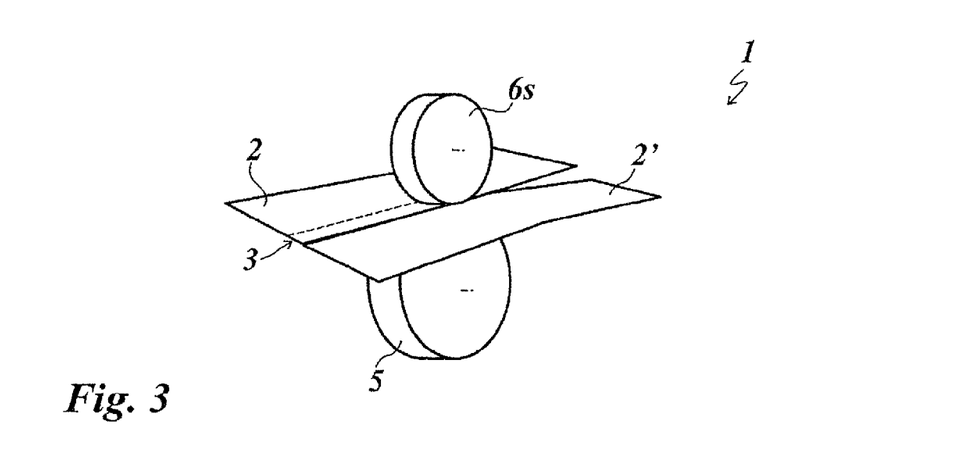
FIG. 3 a second embodiment example of a device for joining two transfer or laminating film webs in a schematic perspective representation.

FIG. 3 shows a second embodiment example of the device 1, in which the sonotrode 6s is formed as a rotating sonotrode and the anvil 5 as a rotating anvil. The representation of the device in FIG. 3, which is essentially formed like the device in FIG. 1, is limited to the sonotrode and the anvil to simplify the representation.

Figure 4A:
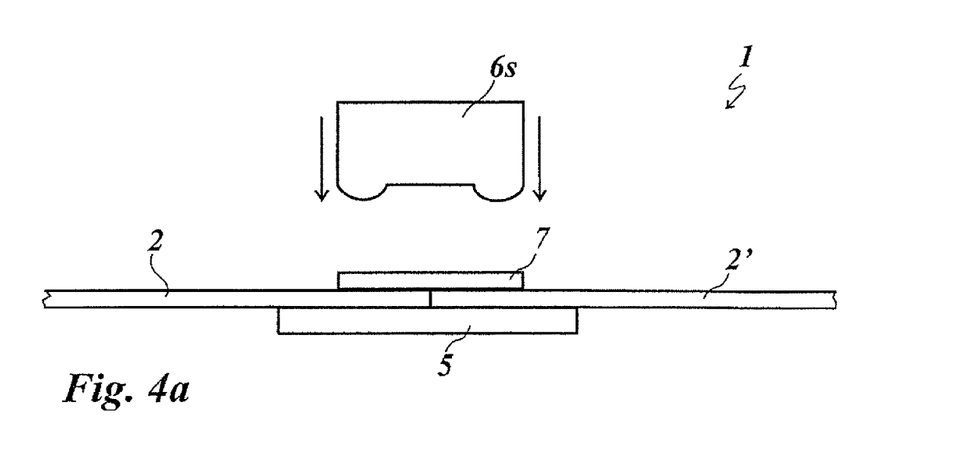
FIG. 4a a third embodiment example of a device for joining two transfer or laminating film webs in a schematic sectional representation.
Figure 4B:
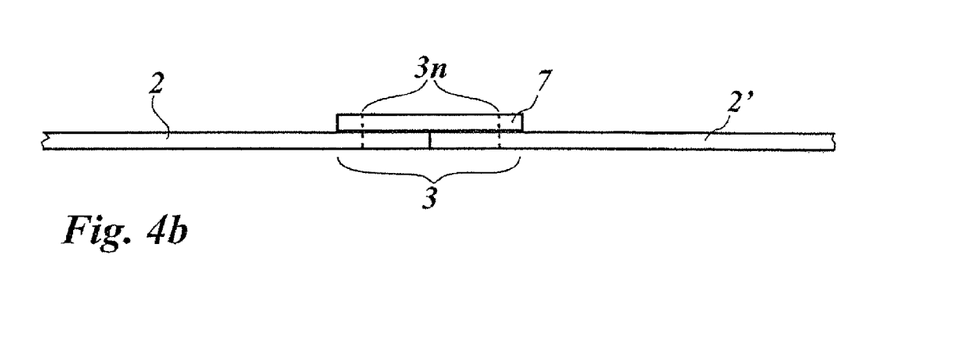
FIG. 4b the film webs in FIG. 4a joined to each other in a schematic sectional representation.
Figure 5A:
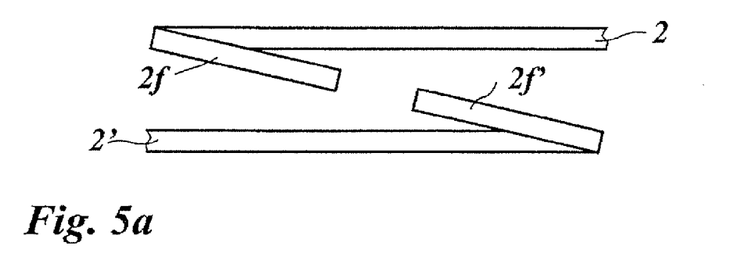
FIG. 5a a first preparation stage of the film end portions for a fourth embodiment example, shown in FIG. 5c, of a device for joining two transfer or laminating film webs in a schematic sectional representation.
Figure 5B:
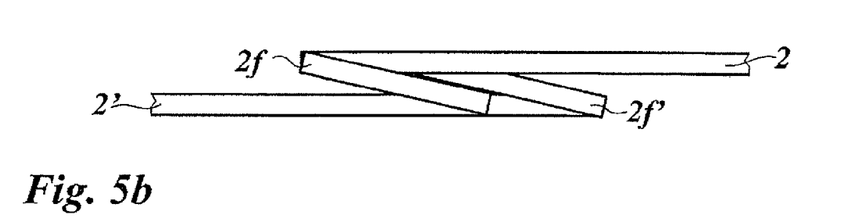
Figure 5C:
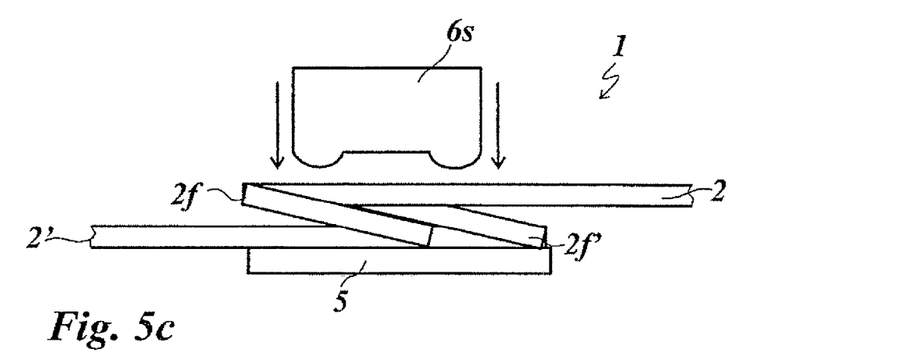
FIG. 5c a fourth embodiment example of a device for joining two transfer or laminating film webs in a schematic sectional representation.
Figure 5D:
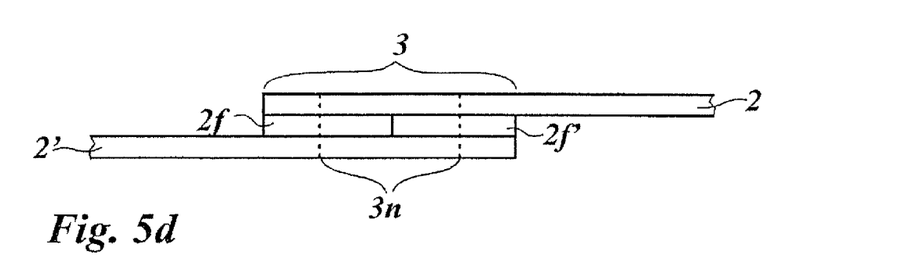
FIG. 5d the film webs in FIG. 5c joined to each other in a schematic sectional representation.

FIG. 4a shows a schematic cut section of a third embodiment example of the device 1, which is essentially formed like the device in FIG. 1. The two film webs 2 and 2' abut directly against one another forming a butt joint and are covered in the joining portion by a splice 7. Like the carrier film of the two film webs, the splice T can consist of a thermoplastic material. It can, for example, be fed to the device 1 as a tape which is cut to the width of the film webs after welding. As shown in FIG. 4b, a double seam can be provided which is formed from two weld seams 3n. The advantage of this embodiment example is that the two weld seams 3n are formed directly between the thermoplastic materials which can be welded to each other, with the result that the weld seams are formed with optimal tensile strength.

FIGS. 5a to 5d show an embodiment in which the end portions of the film webs 2 and 2' are each bent or folded by 90° and thus form a folding portion 2f or 2f'. Increased strength thereby occurs in one of the weld seams 3n because the carrier films of the two film webs lie one on top of the other as a result of the folding over in the folding portion and the carrier films engage with one another or interlock contrary to the direction of a subsequent tensile loading.

Figure 6A:
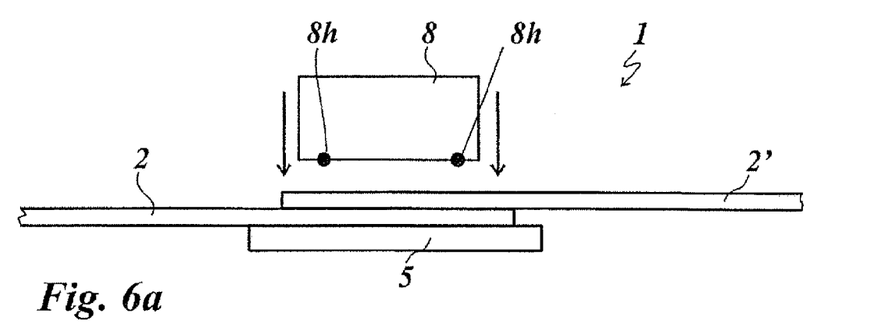
FIG. 6a a fifth embodiment example of a device for joining two transfer or laminating film webs in a schematic sectional representation.
Figure 6B:
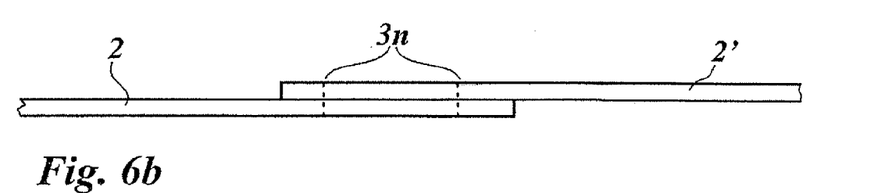
FIG. 6b the film webs in FIG. 6a joined to each other in a schematic sectional representation.

FIGS. 6a and 6b show a further embodiment example in which contact welding is provided as the joining process. Instead of the ultrasonic welding head in FIG. 1, a contact welding head 8 is provided which, on its underside facing the lap joint, has two wire- or tape-shaped heating elements 8h spaced apart from one another which, when the contact welding head 8 is lowered onto the film webs 2 and 2' to be joined, form two weld seams 3n by local thermal melting of the carrier films. Mixed layers also form in the weld seams, as described further below in FIG. 8.

Figure 7A:
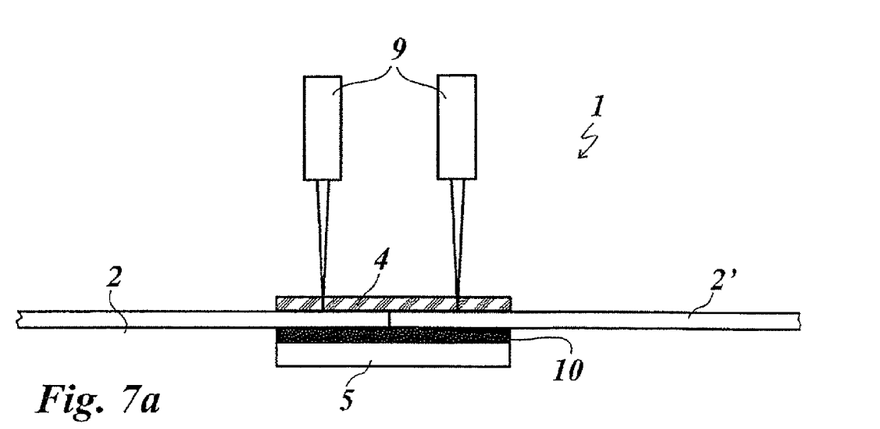
FIG. 7a a sixth embodiment example of a device for joining two transfer or laminating film webs in a schematic sectional representation.
Figure 7B:
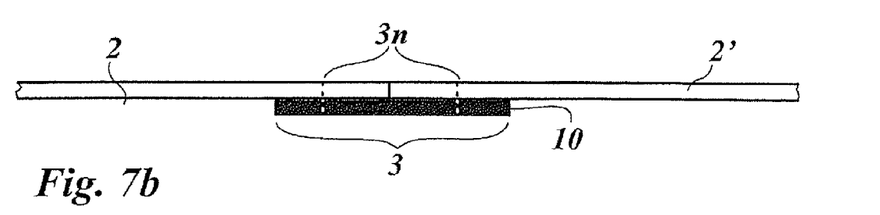
FIG. 7b the film webs in FIG. 7a joined to each other in a schematic sectional representation.

FIGS. 7a and 7b show a further embodiment example in which the film webs 2 and 2' are joined to one another by laser welding. In the embodiment example two laser welding heads 9 spaced apart from one another are provided which enable the film webs 2 and 2' which are to be joined to be heated linearly. For this, the laser welding heads 9 can be formed to be displaceable along the seam axis or non-displaceable laser welding heads with an optical beam deflection can be provided. The upper side of the supporting device facing the laser welding heads 9 is formed transparent for the laser radiation used. The two film webs 2 and 2' form a butt joint below which an absorbing layer 10 for the laser radiation formed as a black splice film is arranged. The anvil 5 is arranged below the splice film. The two film webs 2 and 2' are advantageously aligned such that the carrier film lies on the splice film.

If the contact welding head 8 is equipped with two or more heating elements 8h or the laser welding head 9 is equipped with two or more laser beams, the generation of complex, in particular oscillating, multiple seams with increased strength can thus also be produced by rotating the contact welding head 8 about its longitudinal axis or in the case of the laser welding head 9 by rotating the laser welding head 9 about its longitudinal axis or by correspondingly adjusting the optical beam deflection. It is also possible here to combine the multiple seams with the previously described width variations of the seam and/or seam interruptions.

Figure 8:
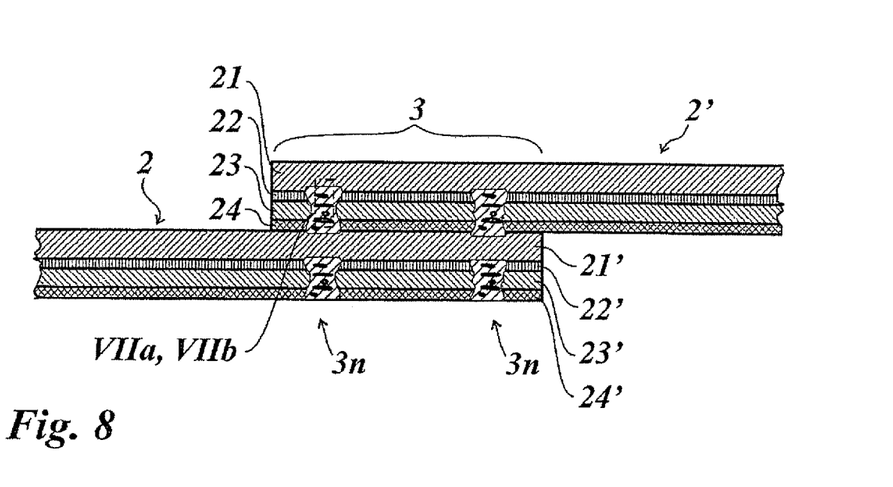
FIG. 8 the film end portions welded to each other in the layer structure a schematic sectional representation.

With reference to a schematic sectional representation, FIG. 8 shows the layer structure of two film webs 2 and 2' welded to each other and the formation of the weld seams 3n in detail.

The two film webs 2 and 2' are formed as multilayer bodies. A waxy separating layer 22, a transfer layer 23 and an in particular metallic reflective layer 24 are arranged on a carrier film 21, which can be formed for example from polyester, in particular PET (PET=polyethylene terephthalate). The reflective layer can, fore example, be formed from metals such as aluminum, copper, chromium or from HRI layers (HRI=high refractive index) such as e.g. ZnS or $TiO_2$ or from a multilayer system over the whole surface or textured, e.g. by partial metallization or demetallization. Combinations of these are likewise possible. An adhesive layer can be provided for example as a further layer.

Figure 9A:
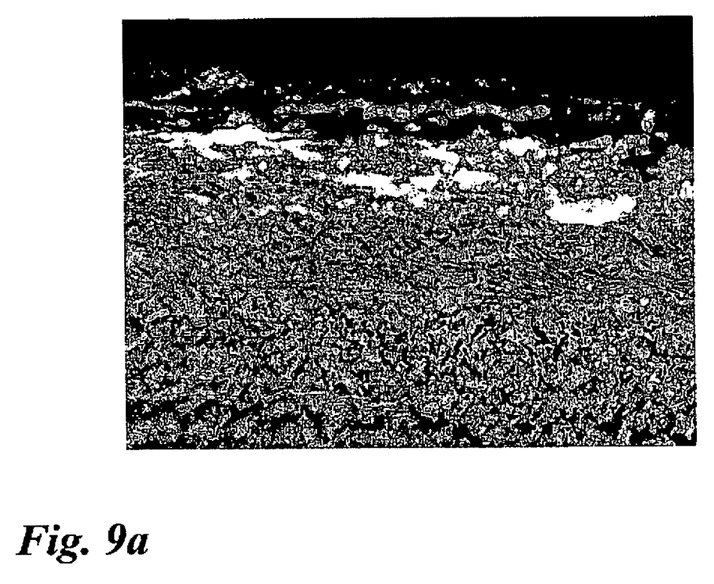
FIG. 9a a sectional view of a film-welded joint magnified 10 times.
Figure 9B:
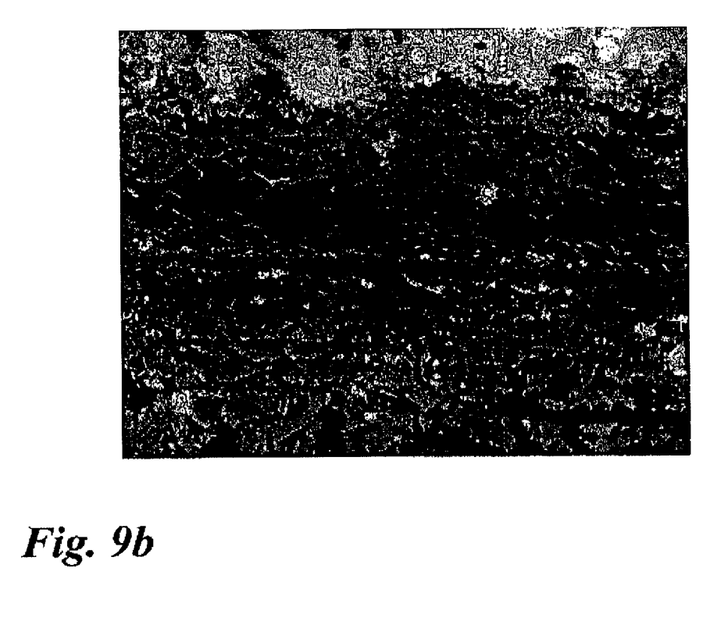
FIG. 9b a sectional view of a film-welded joint magnified 20 times.

As tests have shown, mixed structures are formed in the weld seams 3n, wherein the carrier films 21 form a continuous joining layer in which clusters of the remaining layers are incorporated. As FIGS. 9a and 9b show, the strata have become mixed. Although the mixed layer is not as homogeneous as the carrier film, it still has sufficient tensile strength to enable the film to be stamped or laminated, as described further above.

As experiments with different welding, processes have shown, although the tensile strength of a conventional splice is not achieved, the minimum demand to be placed on a splice, of a tensile strength of more than 13 N/cm, is achieved. The tensile strength was, in each case, determined using a Zwick testing machine.

The following tensile strengths were found for an ultrasonic welded joint for films made of PET with a seam width of 0.8 mm depending on the material thickness:
PET 19 µm: 215 N/cm
PET 50 µm: 47.0 N/cm With a thickness of 9 µm the starling material has a tensile strength of 40-45 N/cm.

Conventional splice tape coated with adhesive has a tensile strength of 30-40 N/cm. With a conventional splice and a 19 µm thick PET film a tensile strength of 35-45 N/cm is achieved.

The splice of the above-mentioned PET material welded according to the invention had a tensile strength of 15-25 N/cm, which is sufficient for the further processing of the joined film webs in a roll-to-roll process.

In a further experiment, film webs of a hot stamping film were joined by ultrasonic welding with a seam width of 0.6-1.0 mm, wherein the tensile strength per seam was 12-19 N/cm.

With a hot stamping film with pigmented adhesive a tensile strength of only 3.0 N/cm per seam was achieved for the same seam width of 0.6-1.6 mm.

Further experiments were carried out to determine the influence of the seam width and the welding process:
ultrasonic welding (per 0.5-mm seam): 4.1 N/cm
ultrasonic welding (per 1-mm seam); 8.5 N/cm
impulse welding or contact welding (per 1.6-mm seam): 12.8 N/cm.

Clearly the width of the weld seam has the decisive influence on the tensile strength of the weld seam.

The following demands were placed on the joint between the two film webs 2 and 2':

As was further shown, the following results could be achieved, when joining film webs of a hot stamping film with a total thickness of approximately 19 µm:
production of a joint registered with +/−0.5-mm tolerance;
maximum width of the joint 3 mm;
application of the joint, i.e. thickness of the joint not greater than when formed using splice tape;
adhesion so good that the film withstands the tensile forces arising in a typical application machine;
length of the joint: in the range of from 10 to 650 mm.

LIST OF REFERENCE NUMBERS

1 Device for joining film webs
2, 2' Film web
2f, 2f' Folding portion
2v Feed roller
3 Lap joint
3n Weld seam
4, 4' Supporting device
4j Adjusting device
5 Anvil
6 Ultrasonic welding head
6a Amplitude transformer
6s Sonotrode
6w Ultrasonic transducer
7 Splice film
8 Contact welding head
8h Heating element
9 Laser welding head
10 Absorbing layer
21 Carrier film
22 Separating layer
23 Transfer layer
24 Metal layer

The invention claimed is:
1. A method for joining an end portion of a first film web to an end portion of a second film web, the method comprising:

providing a first transfer film to form the first film web, the first transfer film comprising a thermoplastic carrier film, a decorative layer and a separating layer disposed between the carrier film and the decorative layer for facilitating removal of the decorative layer from the carrier film of the first transfer film;

providing a second transfer film to form the second film web, the second transfer film comprising a thermoplastic carrier film, a decorative layer and a separating layer disposed between the carrier film and the decorative layer for facilitating removal of the decorative layer from the carrier film of the second transfer film;

bringing the end portions of the first and second film webs together, wherein the first and second film webs are aligned in a longitudinal direction and a common joining portion is formed between the first and the second film web; and moving a weld head having two weld tips across the common joining portion in a direction perpendicular to the longitudinal direction to form a double weld seam in the common joining portion, in which the end portions of the first and second film webs are joined to each other by a welding process.

2. A method according to claim 1, wherein the common joining portion is formed as a lap joint.

3. A method according to claim 1, wherein the common joining portion is formed as a butt joint which is covered by a splice film.

4. A method according to claim 1, wherein the first and second film webs are joined to each other by means of ultrasonic welding.

5. A method according to claim 1, wherein the first and second film webs are joined to each other by means of contact welding.

6. A method according to claim 5, wherein an electric heating element is used to form a weld seam.

7. A method according to claim 1, wherein the first and second film webs are joined to each other by means of laser welding.

8. A method according to claim 7, wherein an absorbing layer for laser light is arranged in the joining portion below the first and the second film web.

9. A method according to claim 8, wherein a splice film which absorbs laser light is used as absorbing layer.

10. A method according to claim 1, wherein a continuous weld seam is formed.

11. A method according to claim 1, wherein a discontinuous weld seam is formed.

12. A method according to claim 1, wherein a weld seam is formed in an oscillating shape.

13. A method according to claim 1, wherein the first and second film webs are aligned with one another such that the motifs and/or register marks arranged on the first film web are aligned with the motifs and/or register marks arranged on the second film web in the joining portion registered with a position tolerance better than +/−0.5 mm.

14. A method according to claim 1, wherein a portion of the decorative layer of at least one of the first and second film webs is removed locally in the area of the common joining portion before the weld seam is formed.

15. A method according to claim 1, wherein such a first and second film web are joined to each other which have a separating layer in order to make it easier to detach the decorative layer from the thermoplastic carrier film.

16. A method according to claim 1, wherein such a first and second film web are joined to each other, which webs have an adhesive layer.

* * * * *

UNITED STATES PATENT AND TRADEMARK OFFICE
CERTIFICATE OF CORRECTION

PATENT NO. : 9,782,927 B2  
APPLICATION NO. : 14/342090  
DATED : October 10, 2017  
INVENTOR(S) : Hansen et al.

Page 1 of 1

It is certified that error appears in the above-identified patent and that said Letters Patent is hereby corrected as shown below:

In the Specification

Column 9, Line 42:  now reads "can, fore example,"  
should read -- can, for example, --

Column 10, Line 1:  now reads "thickness of 9 μm"  
should read -- thickness of 19 μm --

Signed and Sealed this  
Third Day of July, 2018

Andrei Iancu  
*Director of the United States Patent and Trademark Office*